Patented Dec. 28, 1926.

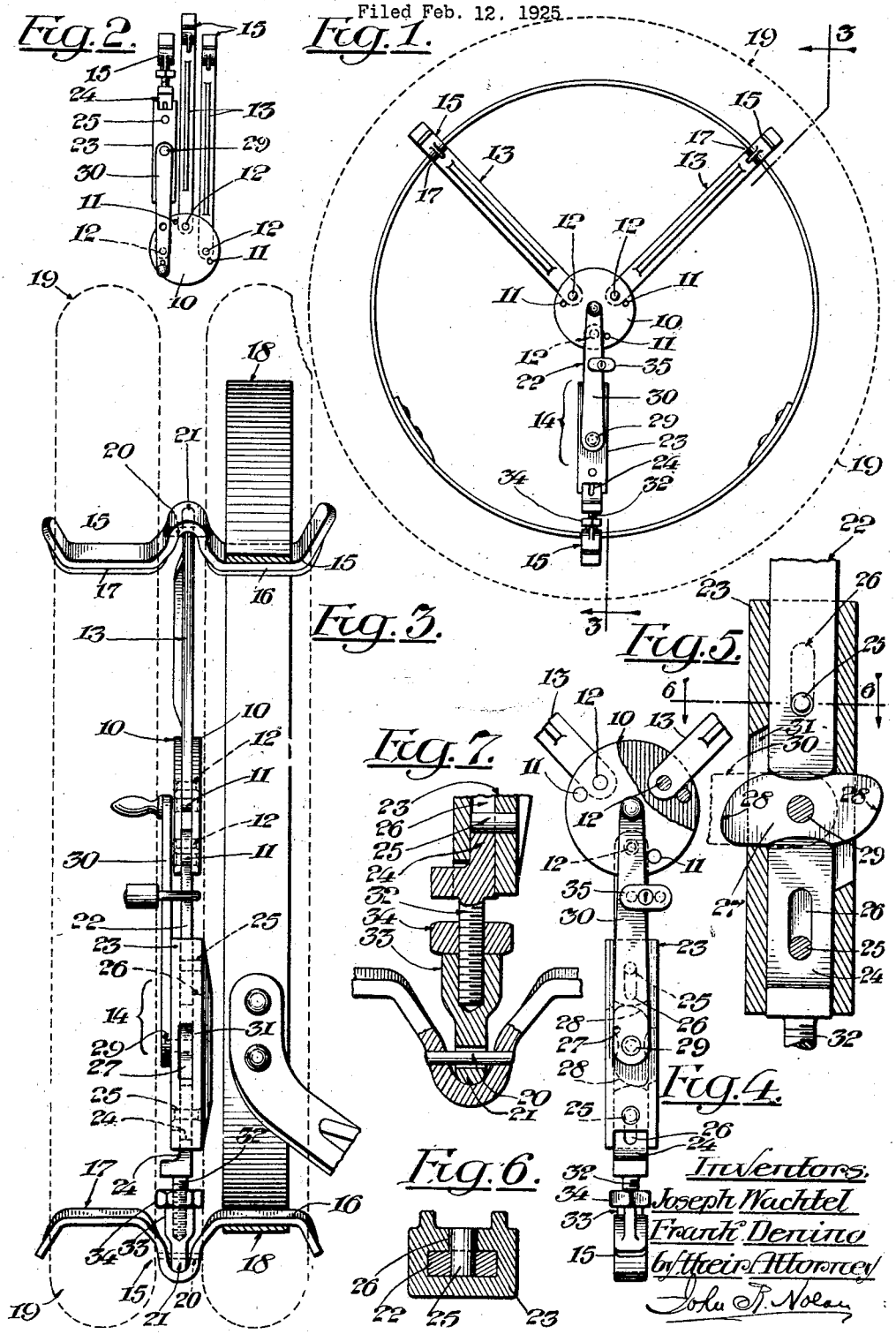

1,612,403

UNITED STATES PATENT OFFICE.

JOSEPH WACHTEL, OF NEW YORK, AND FRANK DENINO, OF LONG ISLAND CITY, NEW YORK.

TIRE CARRIER FOR AUTOMOBILES.

Application filed February 12, 1925. Serial No. 8,604.

This invention relates to tire-carriers for automobiles, its object being to provide a carrier of simple and efficient construction and operation that can be readily applied to the usual fixed spare-tire supporting rim on the back of an automobile so as to enable the carrying of an additional spare tire, which carrier can be folded into small compass for convenience of packing or can be opened and applied to the fixed supporting rim, as occasion may require.

The invention comprises novel features of construction and combinations of parts which will be hereinafter described and claimed.

In the drawings—

Figure 1 is an elevation of our improved tire-carrier as applied to the usual fixed tire-supporting rim on the back of an automobile.

Fig. 2 is an elevation, on a smaller scale, of the tire-carrier as collapsed or folded.

Fig. 3 is a section, enlarged, through the carrier and the fixed supporting rim, as on the line 3—3 of Fig. 1.

Fig. 4 is an elevation of a portion of the carrier, showing the locking and releasing devices therefor, including an adjustable clamping shoe.

Fig. 5 is a section of a movable cam-supporting member showing a double-acting cam therein and oppositely movable members operable by the cam.

Fig. 6 is a transverse section as on the line 6—6 of Fig. 5.

Fig. 7 is a sectional detail of the clamping shoe and adjuncts.

Referring to the drawings, 10 designates a central supporting member comprising, preferably, two parallel discs rigidly connected and held apart by three distance pins 11 arranged in spaced relation to each other adjacent the periphery of the member. Pivoted to and between the discs, adjacent the respective pins, as at 12, are the inner ends of three arms 13, 13, 14 which when swung into radial positions abut against the opposing pins, such pins serving as stops to limit the radial throw and position of the respective arms, as seen in Fig. 1. Each of the arms is provided at its outer end with a tiltably mounted shoe 15 having two saddle members 16, 17, one (16) of which is adapted to be applied to and clamped against the inner face of the usual fixed tire-supporting rim 18 of the car, and the other (17) of which members is adapted to receive and support the rim of an extra spare tire, as indicated by the dotted lines 19 in Figs. 1 and 3.

Each of the two upper arms 13 is an integral structure on the outer end of which the head 15 is mounted, which head comprises an M-form member the central portion of which is pivotally supported on a projecting stem 21 on the extremity of the arm so as to have capacity for limited oscillation on the latter for a purpose hereinafter described. The stem is transversely perforated to receive a suitably-disposed retaining pin 20 in the head.

The third arm 14 comprises three associated sections having relative longitudinal movement, to wit, a main section 22 which is pivoted to the central supporting member at 12, a section 23 slidably fitted at its upper portion on the lower end of the section 22, and a section 24 slidably fitted in the lower portion of the section 23 and equipped with the clamping head 15. The section 23 is preferably a sleeve or casing, of rectangular cross-section, to receive and guide the sections 22, 24, and the associated sections have suitably disposed pin and slot connections 25, 26, respectively, to limit their relative longitudinal movements. Pivoted between the walls of the section 23, in the space between the inner ends of the sections 22, 24, is a cam 27 having oppositely acting end lobes 28 which are adapted to contact with the opposing ends of the respective sections 22, 24 when the cam is partially rotated, thus simultaneously moving the sections 22, 24 in opposite directions and thereby spreading outwardly the several arms 13 and 14 to effect a powerful clamping pressure of their respective shoes 15 against the fixed tire supporting rim 18 and the rim of the extra spare tire which encircles the shoes. When the cam is turned in a reverse direction the sections 22, 24 are released from the action of the cam lobes and hence have capacity for independent longitudinal movement relatively to each other to facilitate the removal of the extra spare tire from the carrier, or the bodily removal of the carrier from the fixed supporting rim. The cam pivot 29 extends through the front wall of the casing and has affixed thereto a handle lever 30 by the proper manipulation of which the cam can be readily actuated. The relation of the lever and cam is such that when the lever is in horizontal position the cam is similarly disposed and the opposing arm sections 22, 24 are free from the action of the cam lobes, but when the lever is swung upward and parallel to the section 22 the cam occupies a vertical position within the section 23 and between the sections 22, 24 so as to effect and maintain the locking relation of the respective shoe bearing arms of the carrier. The side walls of the section 23 are provided with suitable openings 31, as seen in Fig. 5, to permit the requisite movement of the cam.

The lower sliding section 24 comprises an angle member to which the clamping shoe 15 for the arm 14 is adjustably connected. In the present instance the section 24 is provided with a depending threaded stem 32 to which is fitted a nut member 33 having the outer pivot stem 21 upon which the shoe 15 is loosely mounted. (See Fig. 7). Hence by rotating said nut member 33 it may be adjusted within limits toward or from the section 24, as desired, to meet the requirements of tires and tire-rims of various sizes. A lock nut 34 on the stem 32 serves to hold the member 33 in the desired position of adjustment.

By the foregoing described construction it will be seen that the device can be readily collapsed by folding its respective arms, including the cam actuating lever into parallelism, as shown in Fig. 2, so as to occupy small compass for convenience of packing and transportation.

To apply the carrier to the fixed tire rim 18 the arms 13, 13, 14 are swung outward to their open radial positions; the cam lever 30 is swung outward to a horizontal position to free the associated arm sections, and the rearward saddle or seat portions of the shoes 15 are positioned to embrace the inner face of the rim 18. This done, the lever is swung to vertical position, and the several clamping shoes are thus forcibly clamped against the tire rim, as seen in Figs. 1 and 3. The lever may be effectually locked in this radial position by means of a suitable key lock, as 35, when the bail or yoke thereof is passed through registering holes in the lever and the proximate arm section.

When the extra spare-tire carrier is thus applied to the fixed tire rim, the outwardly projecting saddle portions of the shoes afford substantial three-point seats for an extra spare tire, as 19. (Figs. 1 and 3). To mount this tire on the shoes, it is simply necessary to swing out the cam lever to relieve the clamping action of the shoes 15 against the fixed tire rim; then position the extra tire on the projecting saddles of the respective shoes, and then swing the lever upward to the locking position. This done, the carrier is effectually locked to the fixed tire rim, and the extra spare-tire borne by the carrier is likewise locked in place. To release and remove the extra spare tire it is only necessary to swing the cam lever outward as just described. The independent tiltability of the shoes facilitates not only their application to the fixed tire rim but also to the extra tire.

It is to be understood that our invention is not limited to the details of construction disclosed herein, as the device may be modified within the principle of the invention and the scope of the appended claims.

We claim—

1. A tire carrier comprising a central supporting element, two arms extending therefrom, clamping shoes at the outer ends of said arms, and a third arm comprising an inner section extending from said element, an outer section bearing a clamping shoe, and an intermediate section slidably connected with the inner and outer sections, a rotary cam mounted on said intermediate section in the space between the inner ends of the said inner and outer sections and having two oppositely-disposed cam portions for simultaneously engaging and extending said latter sections respectively, and means for actuating said cam.

2. A tire carrier comprising a central supporting element, two arms extending therefrom, clamping shoes at the outer ends of said arms, and a third arm comprising an inner section extending from said element, an outer section, and an intermediate section slidably connected with the inner and outer sections, a clamping shoe adjustably connected with said outer section, rotary cam mounted on said intermediate section in the space between the inner ends of the said inner and outer sections and having two oppositely-disposed cam portions for simultaneously engaging and extending said latter sections respectively, and means for actuating said cam.

3. A tire carrier comprising a central supporting element, three arms pivoted thereto at spaced intervals, and having clamping shoes at ther outer ends, one of said arms comprising longitudinally extensible sections, means, including a lever, for forcibly extending said sections and locking them in extended position, and stops for limiting the angularity of said arms, said stops being so located that the three arms, together with the lever, can be swung into close parallel relation.

4. A tire carrier comprising a central supporting element composed of a pair of members separated by distance pieces arranged at spaced intervals, three arms pivoted between said members in proximity to the respective distance pieces, and a duplex clamping shoe on the outer end of each of said arms, one of said arms comprising an inner section pivoted between the members of the central supporting element, an outer section to which the clamping shoe for said arm is connected, and an intermediate section slidably connecting said inner and outer sections, a rotary cam mounted on said intermediate section in the space between the inner ends of the said inner and outer sections and having oppositely-disposed cam portions for simultaneously engaging and extending said latter sections, and a lever for actuating said cam, said lever being so arranged in relation to the cam as to lie in parallelism with the sectional arm when the sections of the latter are extended by the cam.

JOSEPH WACHTEL.
FRANK DENINO.